April 21, 1970     J. C. NEMESNYIK     3,507,572
PROJECTION HEAD

Filed Nov. 14, 1967     4 Sheets-Sheet 2

INVENTOR
JOHN C. NEMESNYIK

BY

ATTORNEYS

April 21, 1970   J. C. NEMESNYIK   3,507,572
PROJECTION HEAD

Filed Nov. 14, 1967   4 Sheets-Sheet 3

INVENTOR
JOHN C. NEMESNYIK

BY

ATTORNEYS

United States Patent Office 3,507,572
Patented Apr. 21, 1970

3,507,572
PROJECTION HEAD
John C. Nemesnyik, Nutley, N.J., assignor to Charles
Beseler Company, East Orange, N.J., a partnership
Filed Nov. 14, 1967, Ser. No. 682,928
Int. Cl. G03b 21/28
U.S. Cl. 353—98                                    9 Claims

ABSTRACT OF THE DISCLOSURE

A projection head for an optical projector having a mirror mounting means which permits the mirror to be pivoted and moved laterally relative to the incoming cone of light for the purpose of minimizing the size of the mirror and the projection head required for the projector.

---

This invention relates to projection heads for optical projection and more specifically to projection heads for overhead projectors wherein the mirror is mounted both to pivot and to move laterally relative to the incoming cone of light for the purpose of reducing the mirror and projection head size to a minimum.

In overhead projectors there has been a trend toward the use of projection lenses of the shorter focal length and lower cost. The shorter focal length lenses are advantageous because they produce a larger picture in a given projection distance. One suitable form of such lenses has been a single element lens necessarily placed on one side of the mirror, usually between the projection stage and the mirror. This invention is particularly suited to such an arrangement (with the lens on one side of the mirror), but is not limited to it. Nor is it limited to a lens of a single element.

With the use of shorter focal length lenses, it has been found necessary to increase the angle of elevation of the screen image because the projector (with the shorter focal length lenses) is usually placed closer to the projection screen, and a greater angle of elevation is therefore required to raise the bottom of the image above the normal obstructions in front of the viewers. The resulting requirement of increased angle of elevation in such a head results in an increased size of the elevating mirror and head.

In the past, projection head mirrors have been pivoted about a fixed pivot at the top as shown in Woodbury Patent No. 2,496,647, or at the center as shown in Weisglass Patent No. 3,881,670 or at the bottom as shown in Lucas Patent No. 2,859,660. Each pivot point location presents problems as to mirror size limitations. In each it is desirable to keep the mirror size, and thus the size of the projection head, at a minimum.

Where the mirror is pivoted at the top, the mirror must extend downwardly below its usual length (at zero elevation) in order to vignette the incoming cone of light when the mirror is pivoted to its highest angle of elevation.

Where the mirror is pivoted at the center, the same vignetting problem exists. Furthermore, the mirror must extend upwardly above its usable length (at zero elevation) in order not to miss part of the upwardly diverging cone of light.

Where the mirror is pivoted at the bottom, the vignetting problem is avoided, but the movement of the top of the mirror away from the diverging cone is even worse.

It is an object of this invention to provide a projection head in which the mirror (and head) is of minimum size for the elevation required. This is accomplished by mounting the mirror so as to be both pivotable and laterally moveable within the head. Thus the mirror is pivoted about a movable pivot point. The movement of this pivot point is selected so as to permit use of the smallest size mirror required for reflecting the entire incoming cone of light throughout the range of elevation of the head.

It is another object of this invention to provide a projection head in which the point of interception of the central ray of the incoming cone of light with the mirror may be positioned at a preselected point in space throughout the range of elevation of the head, while permitting the mirror to move laterally while it is being pivoted.

These and other objects and features of this invention will be fully understood by those skilled in the art from the following detailed description of typical preferred embodiments of the invention, throughout which description reference is made to the accompanying drawings in which.

Figure 2:
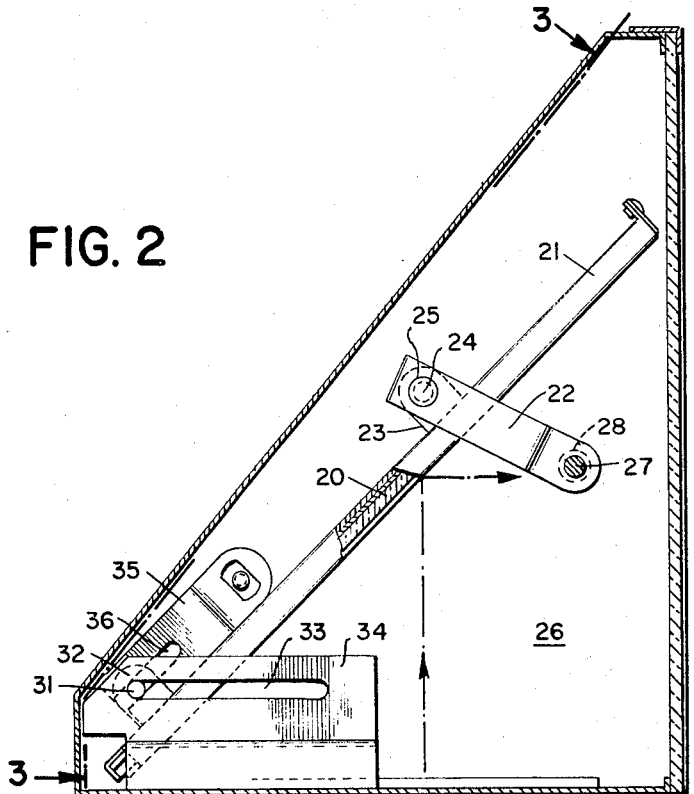
FIGURE 2 is a side elevation in partial cross-section of a projection head embodying the invention.
Figure 3:
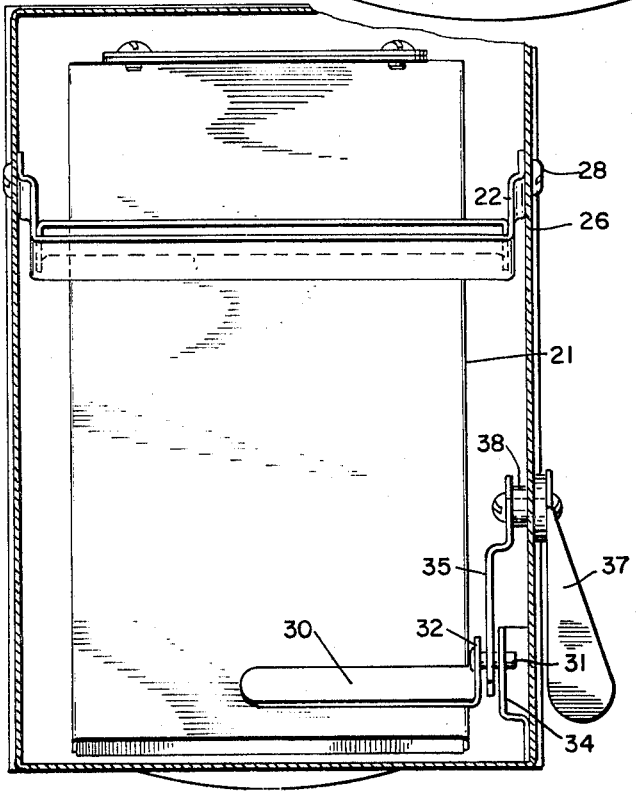
Figure 4:
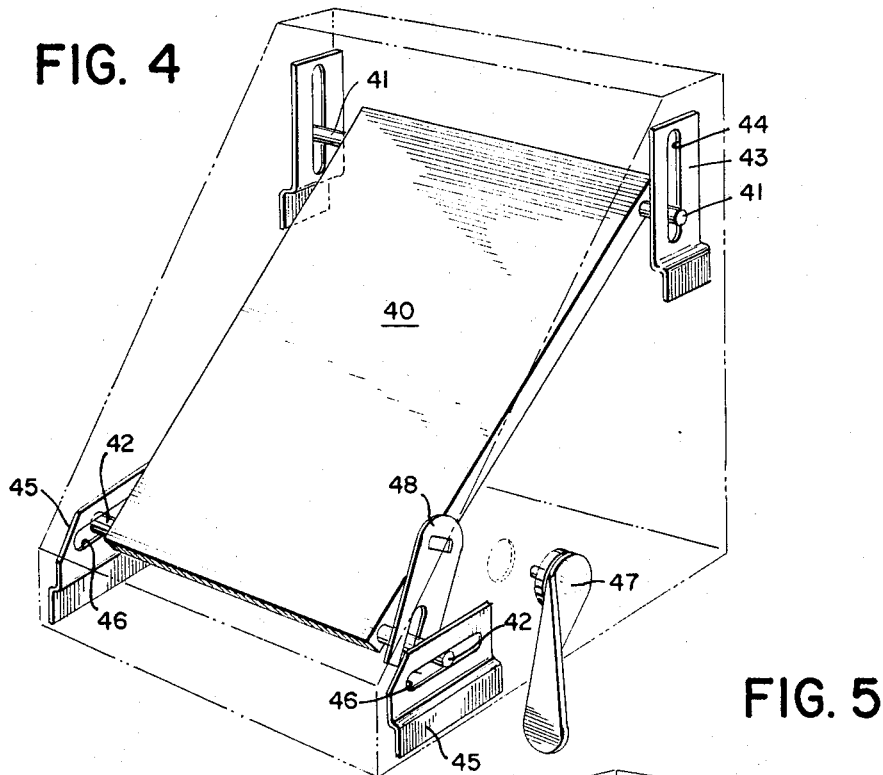
Figure 5:
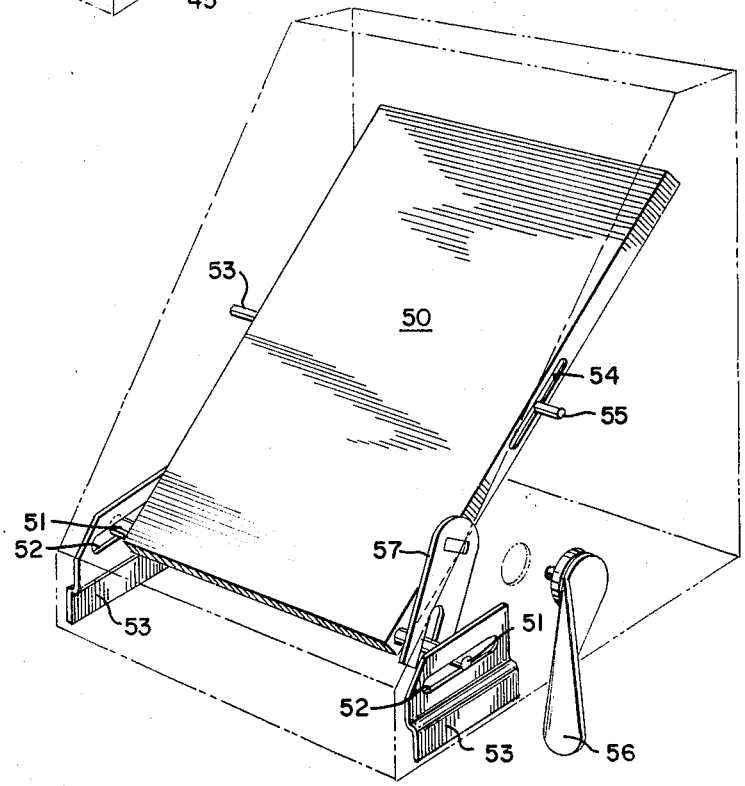
Figure 6:
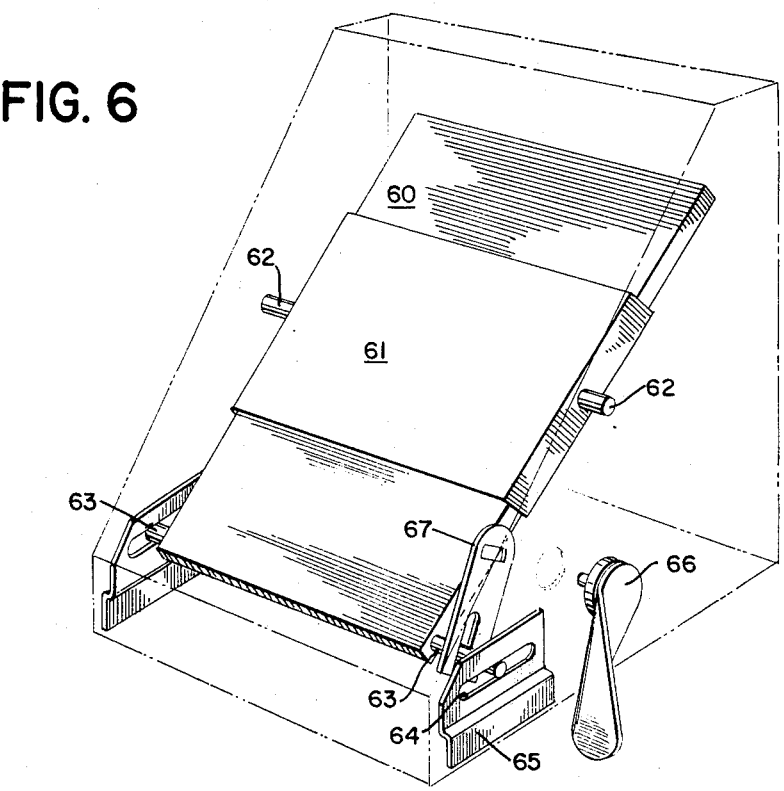

FIGURE 3 is a cross-sectional view of the projection head taken along section lines 3—3 of FIGURE 2; and FIGURES 4, 5 and 6 are perspective views of projection heads of the type shown in FIGURES 2 and 3 embodying three variant forms of the invention.

Figure 1:
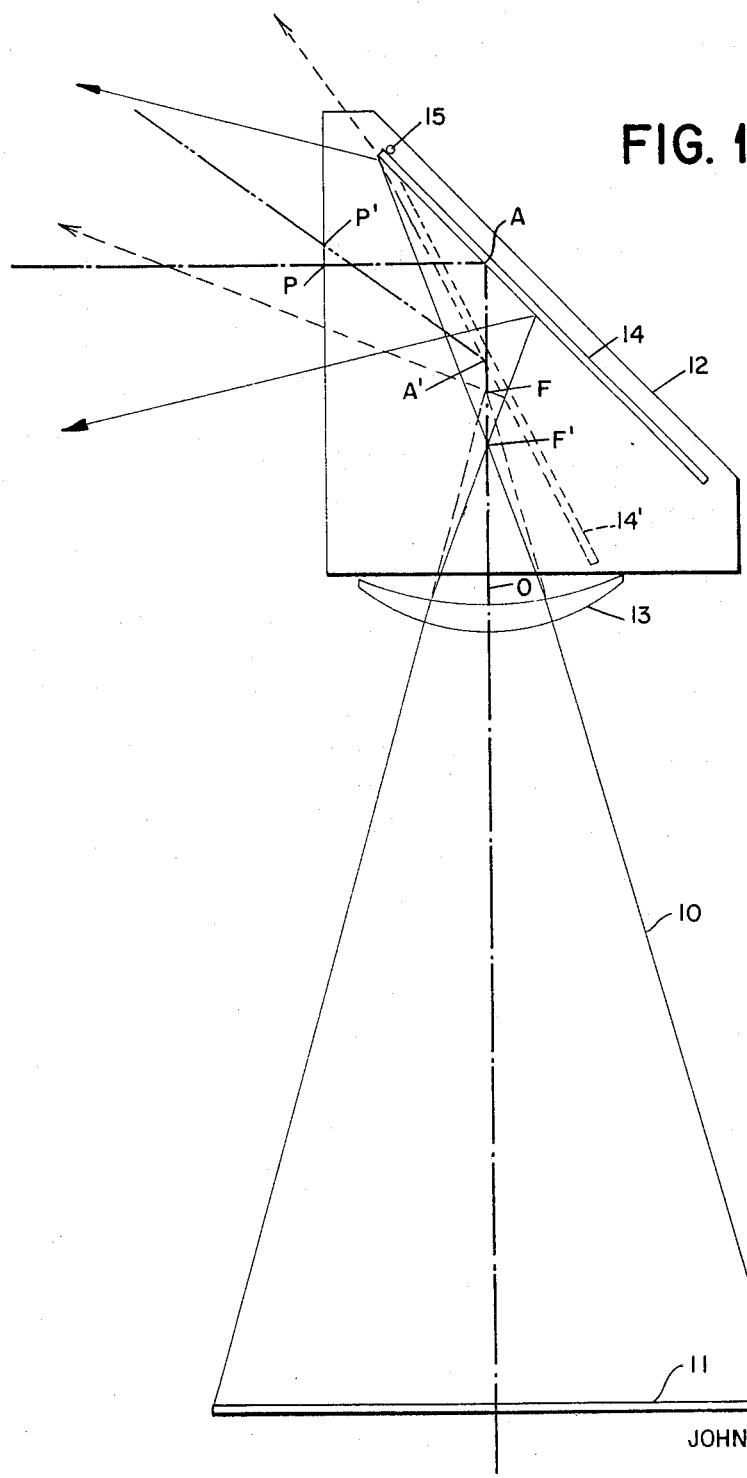
FIGURE 1 is a schematic representation showing the essential optical elements of a projector.

Referring to FIGURE 1 an incoming cone of light, generally designated 10, is projected from projection stage 11 into and through projection head 12 by means of a conventional lamp and condensing lens which are located in a conventional projector body. These latter elements from no part of this invention and are therefore not illustrated.

Cone of light 10 is refracted by projection lens 13 and reflected by mirror 14, which is shown in two positions of elevation. The first position of the mirror (designated 14) is when it is set at a 45° angle to the central ray of the incoming cone of light 10, resulting in horizontal or zero elevaiton of the screen image. The second position of the mirror which is designated 14' is where it is set at maximum elevation. It will be apparent that mirror 14 is pivoted about its upper edge about pivot point 15.

The condensing lens converges the light from the lamp so that it would image the lamp filament at point F, except for the additional convergence caused by projection lens 13. Projection lens 13 further converges the incoming cone of light 10 so as to image the lamp filament at point F'. It will be seen that cone of light 10 is diverging when it meets the mirror, both in its zero and maximum elevation positions.

The mirror is located in the head by, first, selecting the mirror angle to give the required image and screen elevation, and then placing the bottom edge of the mirror as close to the perimeter of the lens as possible (even overlapping it, since part of the lens is masked off by the lens housing) consistent with avoiding vignetting of the screen image. (This is mirror position 14'.) The length of the mirror is then made as small as possible consistent with including the entire beam of light which it must reflect. It has been found most advantageous (from the point of view of keeping the mirror size small) to put the axis of rotation of the mirror near the top edge of the mirror as illustrated.

Having placed and sized the mirror as described above, the path of the axial ray of light within the head is indicated by the sum of the lengths $OA'+A'P'$.

In such a head, when it is desired to project at zero elevation the mirror must be pivoted to mirror position 14. In this case the length of the path of light for the axial ray is $OA+AP$, in general a path which is longer than the original path $OA'+A'P'$). That this is so is obvious since in one case we are dealing with the (approximate) hypotenuse of a triangle, whereas in the other we are dealing with the sum of the two legs. Since the cone of light is diverging as it approaches the mirror and goes on toward the screen, the longer path means that the cone of light has become wider at mirror position 14, with the result that the head must also become wider, and this is objectionable.

It can readily be seen that if mirror 14 in the zero elevation position could be translated (parallel to itself) so that the distance OA were reduced, that this would shorten the path traveled by the diverging light and would result in a smaller narrower head. This invention describes several ways in which this objective can be accomplished. However, before describing this, it should be understood that FIGURE 1 is not intended to show quantitative relationships. It is intended only for the purpose of explaining the reasons, as now understood, for the improved results obtained by this invention. In this regard it should be noted, however, that the actual situation is far more complicated than that described above. For example, in conventional projectors the head can be raised or lowered to change the magnification. The lenses can be simple or compound, and they can be on either or both sides of the mirror. Furthermore the mirror can be replaced by other reflecting means such as a prism. Also the condensing lens which usually is a Fresnel type lens causes dispersion of the light, thus creating fringe color problems.

These considerations were not discussed in order to simplify the description of what is now believed to be the primary reasons for the efficiency of this invention. Regardless of the reasons, however, it has been found to be advantageous to provide a mirror mounting means which permits both pivoting and lateral movement of the mirror within the head. Several embodiments for doing this will now be described.

Referring to FIGURES 2 and 3, mirror 20 is mounted in frame 21, which is pivoted on yoke 22 by means of pivotable bracket 23. Bracket 23 is fixed to frame 21 by means of spot weldments or by any other suitable fixed mounting arrangement. Bracket 23 is pivotably mounted to yoke 22 about pivot point 24 by any conventional means providing for free rotation between the two, such as shoulder rivets 25.

Yoke 22 is itself pivotably mounted to the sides 26 of the projection head housing about pivot point 27. Pivotable connecting means 28 like the above-described one can be of any type which permits free rotation of yoke 22 relative to sides 26.

Fixed to mirror frame 21 adjacent its lower end is bracket 30. Pin 31 extends outwardly from an upright portion 32 of bracket 30 so as to ride in slot 33 of guide 34. Guide 34 is fixed to the adjacent side 26 of the housing as by spot weldments. Slot 33 restricts the movement of pin 31 to the slot axis as shown, thus confining the movement of the lower end of mirror frame 21 to this axis as the mirror frame is pivoted.

Mirror frame 21 is pivoted by means of crank arm 35 which has a slot 36 that is engaged by pin 31. Crank arm 35 is actuated by an external lever 37 that connects to arm 35 by means of a suitable driving key 38.

It can be seen that when crank arm 35 is actuated by depressing or raising lever 37, this causes mirror 20 to pivot about pivot point 24 and also to translate either upwardly or downwardly about pivot point 27 dependent on the direction of turning of crank arm 35.

Thus referring back to the problem stated above relative to FIGURE 1, mirror 20 can be both pivoted and translated so as to reduce the optical path distance OAP travelled by the diverging cone of light. As mirror 20 is pivoted between zero elevation to maximum elevation, pin 31 and slot 33 cause the mirror to translate such that the point of intersection of the central ray of the incoming cone of light stays closer to the same position in space. Relating this to the FIGURE 1 designation, this results in the points A and A' being brought closer together (thus shortening the distance OA), since the pivot point of the mirror moves downwardly as the mirror is pivoted from maximum elevation to zero elevation.

An alternative embodiment is shown in FIGURE 4. Description of this embodiment will be limited to those portions which differ from the embodiment described above. In this embodiment mirror frame 40 carries a pair of outwardly extending pins 41 adjacent its upper edge and a second pair of such pins 42 adjacent its lower edge. Pins 41 ride in guide plates 43 having generally vertical slots 44, and pins 42 ride in guide plates 45 having generally horizontal slots 46. Mirror frame 40 is caused to move by the same lever 47 and crank arm 48 assembly described above.

It will be apparent that this arrangement causes the mirror to follow a motion similar to that of a ladder sliding down a wall as the bottom stays in contact with the floor. It should be understood that the slots 44 and 46 can be curved if desired to obtain intermediate positions of the mirror as desired.

Another embodiment is illustrated in FIGUREE 5 in which mirror frame 50 near its lower edge has outwardly extending pins 51 which ride in horizontal slots 52 of guide plate 53. Mirror frame 50 has a pair of slots 54 on each side (only one is visible) of the frame. Engaging each of these slots 54 are two pins 55 which are mounted to the sides of the housing of the projection head. The mirror is moved in the same manner as described above by the lever 56 and crank arm 57. In this arrangement, while the bottom of the mirror is confined to move horizontally by the slots 52, the mirror actually pivots about the axis of fixed pins 55 so that the mirror always intersects the central ray of the incoming cone of light at a fixed point in space, but the length of the mirror is distributed on either side of this axis of rotation as required by the cone of light which it is intercepting. Although the central ray is intercepted at a constant point in space, a different point on the mirror does the intersecting at each elevation angle of the mirror.

Referring to FIGURE 6, another possible variation is one wherein mirror frame 60 is slidably mounted in a second frame 61 which, in turn, carries pivot arms 62, which can suitably be supported in mating holes in the sides of the housing. As in the embodiment of FIGURE 5, frame 60 carries the pins 63 projecting from each side near the base and these pins again ride in the horizontally disposed slots 64 in guides 65. Actuation in this case by lever 66 through crank 67 causes the mirror to revolve about arms 62, the mirror in its frame 60 being forced to slide up and down within frame 61 as required by the horizontal slots 64, again distributing the length of the mirror on either side of the axis of rotation, as required by the cone of light which it is intercepting.

It should be understood that the preceding description relates only to typical embodiments of this invention. While this description has been directed mainly to the application of this invention to overhead projectors, it is apparent that it can be used with other types of optical projectors, including opaque projectors. Likewise, it is apparent that the invention can be adapted to optical systems other than those described, including systems with lenses on both sides of the mirror and with lenses on either side of the mirror. Other variations and modifications within the spirit of this invention will be apparent to those skilled in the art, and it is therefore intended that the scope of this patent be not limited to the preceding descripion, but rather by a fair construction of the following claims.

What is claimed is:

1. A projection head for receiving light from a projection stage and projecting it at an adjustable angle onto a projection screen, said projection head comprising:

a housing having a first aperture for receiving light from a projection stage and a second aperture for transmitting light to a projection screen;

a movable reflector disposed within said housing for reflecting light from said first aperture through said second aperture;

first guide means mounted within said housing and engaging a first portion of said movable reflector to restrict the motion of said first portion of said movable reflector to a first predetermined path relative to said housing;

second guide means mounted within said housing and engaging a second portion of said movable reflector to restrict the motion of said second portion of said movable reflector to a second predetermined path relative to said housing, said second predetermined path being disposed at an angle to said first predetermined path; and actuating means for moving said movable reflector under control of said first and second guide means whereby said movable reflector is simultaneously pivoted and translated to simultaneously adjust the angle at which light from said first aperture is projected through said second aperture, and to adjust the point on said movable reflector which intercepts the central ray of light from said first aperture.

2. The projection head of claim 1 wherein said first guide means comprises a pin mounted on said first portion of said movable reflector and a guide member mounted on said housing, said guide member having a slot for engaging and guiding said pin along said first predetermined path relative to said housing.

3. The projection head of claim 2 wherein said second guide means comprises a second pin mounted on said second portion of said reflector means and a second guide member mounted on said housing, said second guide member having a slot for engaging and guiding said second pin along said second predetermined path relative to said housing.

4. The projection head of claim 3 wherein said second predetermined path is oriented at substantially right angles to said first predetermined path.

5. The projection head of claim 2 wherein said actuating means comprises an actuating member mounted on the exterior of said housing for operation by an operator and a link member disposed within said housing for connecting said actuating member to said pin.

6. The projection head of claim 1 wherein said second guide means comprises an elongated link member disposed within said housing, means for pivotally connecting one end of said link member to said housing, and means for pivotally connecting the other end of said link member to said second portion of said movable reflector whereby said second portion of said movable reflector is restricted to move in an arcuate path with respect to said one end of said link member.

7. The projection head of claim 1 wherein said second guide means comprises a first elongated link member disposed within said housing, means for pivotally connecting one end of said first link member to said housing, a second elongated link member, means for pivotally connecting one end of said second link member to the other end of said first link member, and means for connecting the other end of said second link member to said movable reflector.

8. The projection head of claim 1 wherein said second guide means comprises a frame disposed within said housing for slidably holding said movable reflector and means for pivotally connecting said frame to said housing.

9. The projection head of claim 1 wherein said second guide means comprises a pair of pins projecting inwardly from the sides of said housing and a frame for holding said movable reflector, said frame having a pair of slots located at opposite sides thereof for engaging said pins.

References Cited
UNITED STATES PATENTS

| | | | |
|---|---|---|---|
| 2,944,461 | 7/1960 | Howell et al. | 353—37 |
| 3,350,158 | 10/1967 | Blattner | 353—44 |

SAMUEL S. MATTHEWS, Primary Examiner